E. A. MIDGLEY & M. H. SCARLET.
REAMING TOOL.
APPLICATION FILED NOV. 22, 1911.
1,049,125.
Patented Dec. 31, 1912.
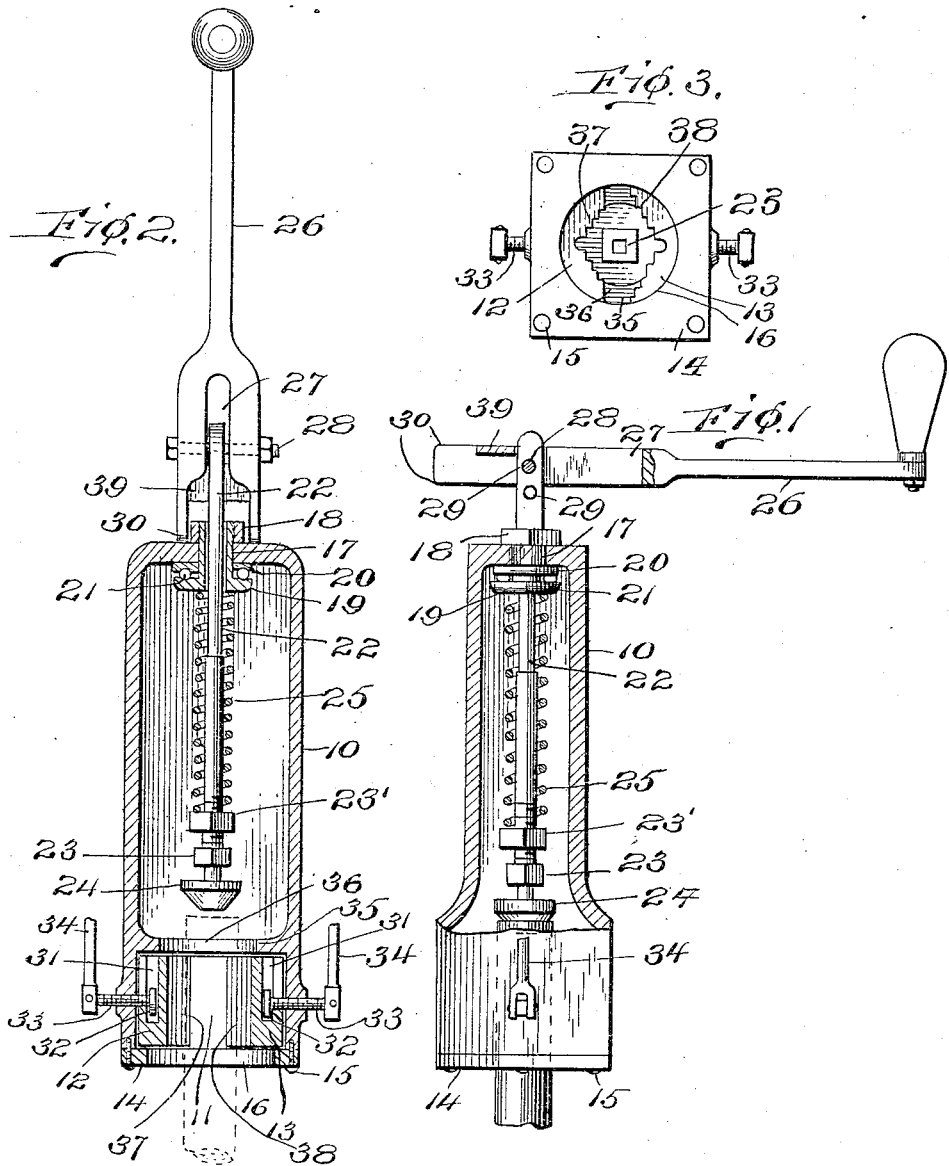

UNITED STATES PATENT OFFICE.

EPHRAIM A. MIDGLEY AND MAURICE H. SCARLET, OF SALT LAKE CITY, UTAH.

REAMING-TOOL.

1,049,125.  Specification of Letters Patent.  Patented Dec. 31, 1912.

Application filed November 22, 1911. Serial No. 661,817.

*To all whom it may concern:*

Be it known that we, EPHRAIM A. MIDGLEY and MAURICE H. SCARLET, citizens of the United States, residing at Salt Lake City, in the county of Salt Lake and State of Utah, have invented certain new and useful Improvements in Reaming-Tools; and we do hereby declare the following to be a full, clear, and exact description of the invention, such as will enable others skilled in the art to which it appertains to make and use the same.

This invention relates to mechanism for reaming pipes and the like and has for an object to provide improved means for holding and reaming the end of a pipe.

A further object of the invention is to provide a pipe reamer having improved clamp jaws for engaging pipes of various sizes.

A further object of the invention is to provide in a pipe reamer improved means for withdrawing the tool carrying spindle from engagement with the work to permit removal and insertion of pipes.

A further object of the invention is to provide improved bearings for taking the friction of the parts.

With these and other objects in view the invention comprises certain novel constructions, combinations and arrangement of parts as will be hereinafter more fully described and claimed.

In the drawings:—Figure 1 is a view of the improved reaming mechanism seen in side elevation with parts broken away and with the tool in engagement with the work. Fig. 2 is a view taken at right angles to that of Fig. 1 with parts also broken away and showing the tool removed from engagement with the work. Fig. 3 is an inverted plan view of the device.

Like characters of reference indicate corresponding parts throughout the several views.

A housing 10 is provided with a chamber 11 adjacent the bottom in which are clamp jaws 12 and 13 held in position by a head or cap 14 secured upon the housing in any approved manner, as by the bolts or screws 15, and having a work receiving opening 16.

The housing is provided at its upper end, in alinement with the work-receiving opening 16, with a bearing sleeve 17 which extends through the housing and is provided upon the top with a nut 18 and formed with a flange 19 which coöperates with an annular ring 20 to form races for the balls 21 to produce a ball bearing. Through the sleeve 17 the work spindle 22 extends having at its lower end a chuck 23 to receive a tool, as the reamer shown conventionally at 24, and held yieldingly to work by a spring 25 which surrounds such spindle the tension of which is adjusted by the collar 23'.

Pivoted to the upper end of the spindle is a lever 26 bifurcated as indicated at 27 to embrace such spindle and secured thereto by the pivot pin 28, other openings as 29 being provided for differently positioning such pivot pin relative to the lever.

The lower end of the lever is provided with rounded extremities 30 which are proportioned to bear upon the top of the housing, as indicated at Fig. 2, to raise the spindle 22 and the tool therewith out of work position when the lever is raised in alinement with such spindle.

To clamp the jaws 12 and 13 upon the pipe indicated in dotted lines at Figs. 1 and 2, the said jaws are provided with slots 31 proportioned to receive the heads 32 of screws 33 which extend outwardly through the sides of the housing and are provided with pivoted crank arms 34 whereby such screws may be manipulated. The jaw members 12 and 13 are retained in position by a diaphragm 35 positioned within the housing which is pierced by a work-receiving opening 36 so that the work as the pipe indicated in dotted lines, may be inserted through the work openings 16 and 36 and clamped by the jaw members 12 and 13 when actuated by the screws 33.

The jaws 12 and 13 are provided with work engaging edges struck upon different arcs, as indicated more particularly at Fig. 3, the engaging teeth indicated at 37 upon the jaw 12 corresponding to an arc of less radius than that upon which the teeth 38 upon the jaw 13 are arranged. The use of jaws having such different shaped engaging faces enables the jaws to better engage pipes of different sizes and the jaws being movable independently, the pipe or other body upon which work is to be performed may be readily centered by the use of such screws, as will be apparent.

In use the apparatus, positioned as shown at Fig. 2, will have a pipe inserted through the openings 16 and 36 and properly centered and clamped by the manipulation of the screws 33. The proper reaming tool being inserted in the chuck 23 the same will be brought into work position by moving the lever to horizontal position, as shown at Fig. 1, which will lower the tool into engagement with the end of the pipe and at the same time form a lever or sweep by which the tool may be rotated.

We claim:—

1. In a reaming apparatus, a housing, jaw members secured in the lower end of the housing and independently adjustable, a spindle journaled centrally of the housing, a lever pivoted upon the spindle, and means carried by the lever for raising the spindle out of working position.

2. In a reaming apparatus, a housing provided with a work-receiving opening, jaws located upon opposite sides of the work receiving opening and capable of independent adjustment, a spindle extending upon the axis of the housing and in alinement with the work-receiving opening, a sleeve journaled in the top of the housing embracing the spindle, and a lever pivotally connected to the top of the spindle and adapted to serve as a crank when in work-engaging position and to bear upon the housing when the spindle is withdrawn from working position.

3. In a reaming mechanism, a housing, a spindle journaled axially within the housing, clamping jaws adapted to position an article in alinement with the spindle, a sleeve journaled in the top of the housing and embracing the spindle, a lever pivotally connected to the spindle, and a spring bearing at one end against the sleeve and at the opposite end against the spindle and adapted to hold the spindle yieldingly in working position.

4. In a reaming mechanism, a housing, a shaft journaled longitudinally within the housing, clamping members movable from opposite sides of the housing independently, a lever pivoted to the top of the shaft and provided with an extremity adapted to engage the top of the housing and raise the shaft, a spring within the housing adapted to hold the shaft normally yieldingly downward, and a chuck carried by the shaft adapted to engage a reaming tool.

5. In a reaming mechanism, a housing, a ball bearing provided at the top of the housing in axial alinement with the major axis of the housing, a shaft extending through the ball bearing, a crank arm fulcrumed upon the top of the shaft and having an extremity adapted to engage the top of the housing and lift the shaft, a spring embracing the shaft and bearing at one end against the ball bearing, a collar adjustably secured upon the shaft and adapted to vary the tension of the spring, and means to maintain a pipe in axial alinement with the shaft.

In testimony whereof we affix our signatures in presence of two witnesses.

EPHRAIM A. MIDGLEY.
MAURICE H. SCARLET.

Witnesses:
J. W. McKINNEY,
RALPH D. EVANS.